Oct. 5, 1971  J. T. COGHILL  3,609,810
WEB COATING APPARATUS
Filed Oct. 14, 1968  2 Sheets-Sheet 1
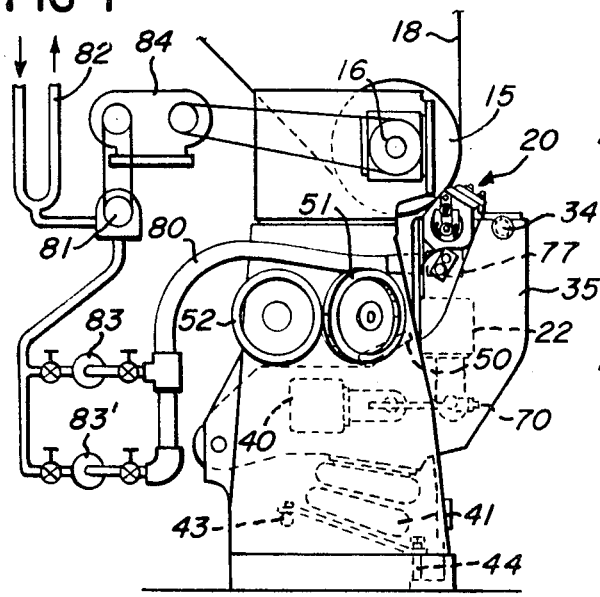
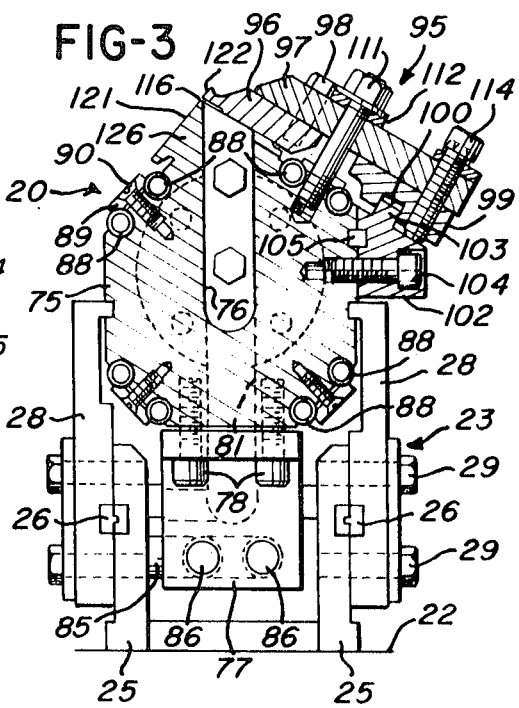
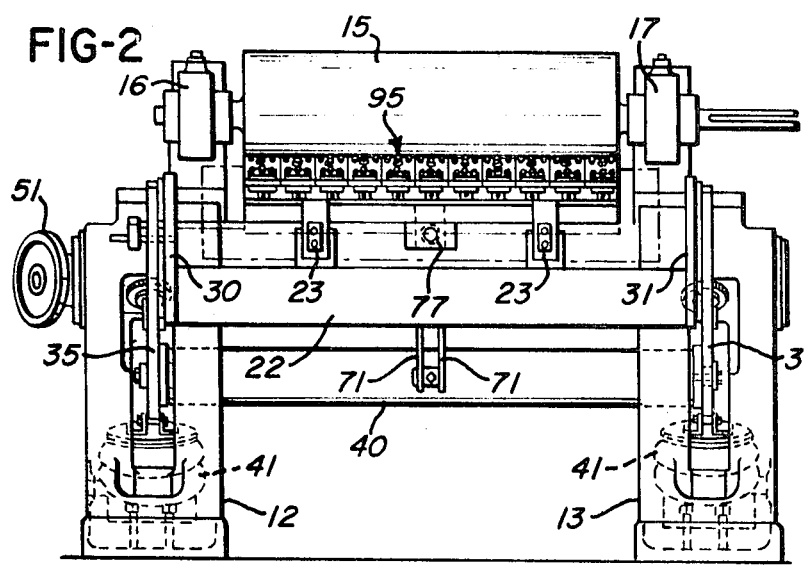
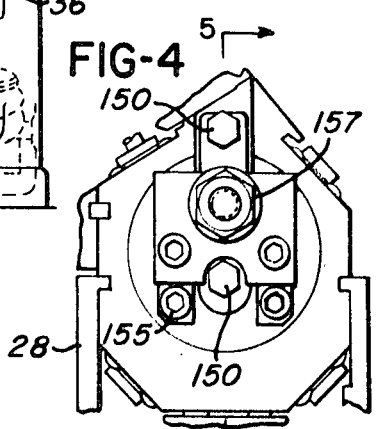
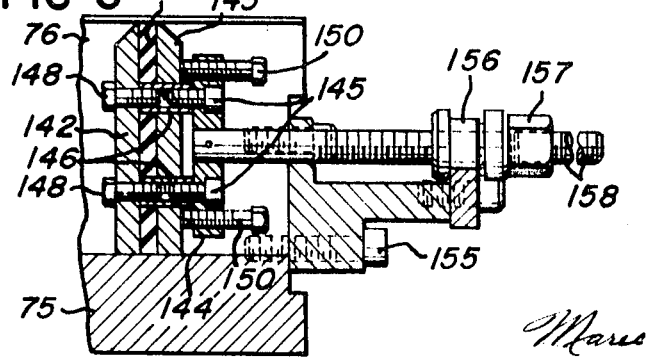
INVENTOR
JAMES T. COGHILL
BY
Marshall, Biebel, French & Bugg
ATTORNEYS

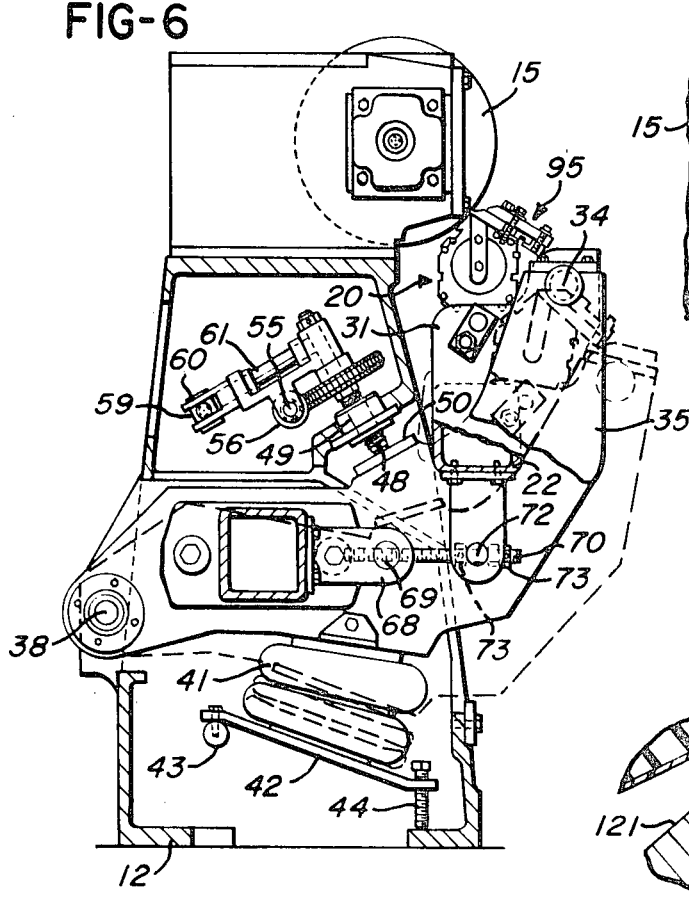
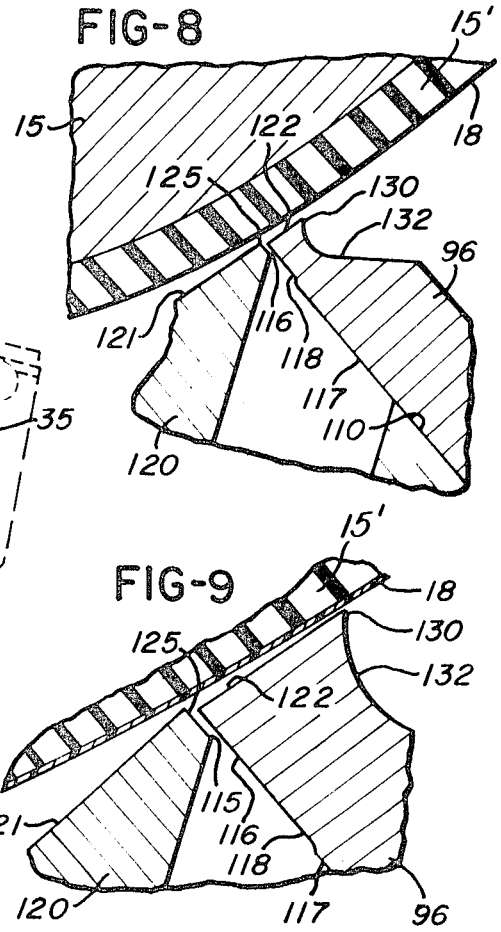
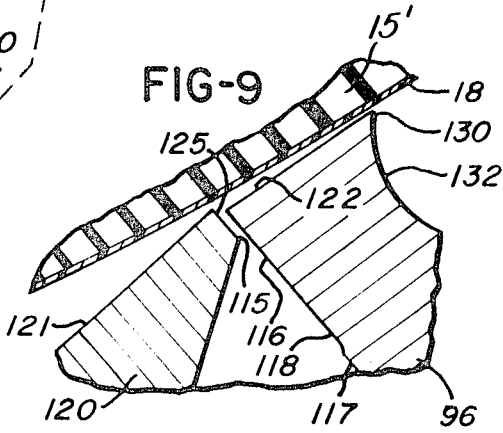
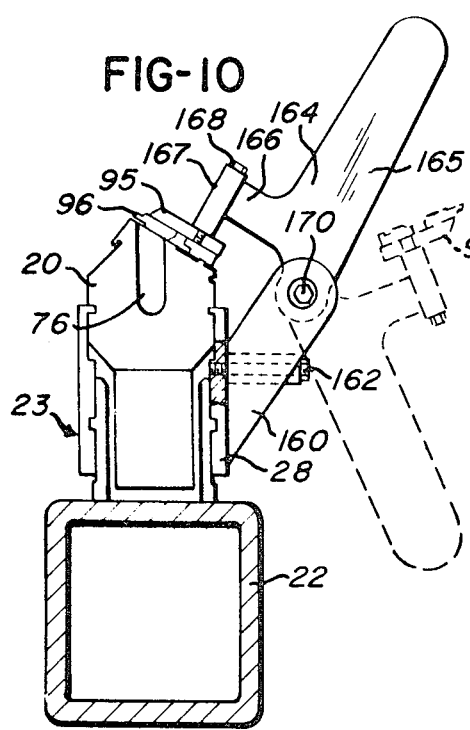
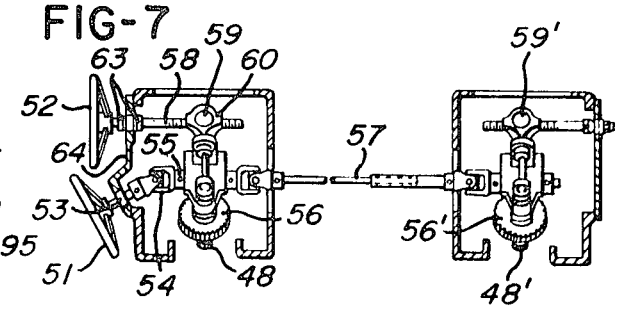
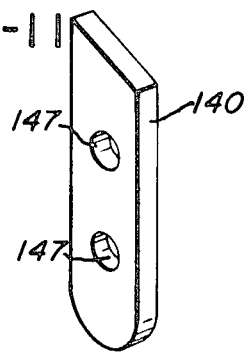

United States Patent Office 3,609,810
Patented Oct. 5, 1971

3,609,810
WEB COATING APPARATUS
James T. Coghill, Rochester, N.Y., assignor to The Black Clawson Company, Hamilton, Ohio
Filed Oct. 14, 1968, Ser. No. 767,159
Int. Cl. B29d 7/00
U.S. Cl. 18—15 R                                                10 Claims

ABSTRACT OF THE DISCLOSURE

A hot melt coater employs a resilient backup roll and an extruder die with an off-running die lip in tapered running relation to the web for ironing onto the web surface a controlled amount of heated coating material. The die employs a narrow and short die orifice, and elastomeric plugs are inserted in each end of the die which are compressed to seal off the die cavity and the orifice to control the width of extrusion. The die is supported on a compound arm arrangement providing adjustment of knife pressure against the web, knife profile, and knife attitude control. Provision is included for rapidly opening up the die for cleaning without disturbing the adjustment of the knife applicator surface.

BACKGROUND OF THE INVENTION

"Hot melts" comprise a wide range of materials, many of which are newly or recently formulated, which are applied as a coating to a web of sheet material, such as paper, to impart certain qualities or characteristics to the finished product. One form of hot melt material comprises pure paraffin waxes which are applied at a relatively low temperature of from 200° to 240° F., are relatively easy to handle, and thus are applied by applicator rolls, and the coating weight controlled by suitable doctor blades. On the other extreme, thermoplastic materials such as polyethylene, polypropylene, and the like, have been applied to substrates by the use of elongated flat film extrusion dies, such as shown in U.S. Pat. No. 3,142,090, in which a screw type extruder processes and converts granules of such plastic material in a continuous process, into an elongated die having accurately controllable die lips through which this material is extruded, usually downwardly, and applied to the web. This type of plastic material is thus one which has sufficient strength and tenacity at the extruder lips to withstand some stretch and draw from the die lips with reduction to the desired weight at the web.

In between the relatively easy-to-apply coatings and low temperature paraffins on the one hand, and the high temperature polyethylenes, polypropylenes and the like, there is a variety of materials which are too fluid and too runny, when melted, to be applied by a common extruder on the one hand, and are at too high a temperature, or too readily oxidized, or are too sticky or difficult to handle to be applied by a roll applicator. These include various microcrystalline waxes and modified waxes including wax-polymer-additive blends (waxes combined with polyethylenes, polypropylenes, ethyl vinyl acetates and terpolymers with antioxidants, and sometimes surfactants and slip agents), modified polyethylenes, and other material which may vary between highly viscous and sticky substances, which resemble honey at extruding temperatures and materials which are highly liquid and runny at such temperatures, but which rapidly oxidize when subject to air drying. Asphalt is a further example of a hot melt material which is especially difficult to apply. These materials have certain characteristics in common in that they do not lend themselves to roll type application and doctoring, unless operated at high enough temperature to provide low viscosity, nor do they lend themselves to extrusion through a flat film extruder die. Often high temperatures cause deterioration of the material.

Apparatus for handling these materials, known in the art as "hot melts" has achieved only qualified success. Frequently, the applicator consists of an open trough across which the web is pulled under tension or a roll followed by a scraper. In such apparatus, the coat weight depends upon the tension in the web.

SUMMARY OF THE INVENTION

The present invention relates to a hot melt coater, and to one which is particularly adapted to handle a wide variety of coating materials having a wide range of viscosities and temperatures during application. The coater preferably operates on the "dead end" principle in that only the amount of coating necessary is applied to the web.

A new die applicator technique is disclosed in which a die body is formed with a cavity, and a rigid knife blade forms a closure to the cavity and also forms a narrow and short extruding orifice with one of the cavity walls. The web is supported by a backing roll which has a relatively soft elastomeric covering, and the material is applied to the web as it is supported on the backing roll.

The knife has an off-running or trailing land surface at the orifice which is preferably angled to provide a converging nip with the web and actually irons the hot melt material onto the rapidly moving web surface. An on-running land is formed by the die which forms a stepped configuration at the orifice so that the material, which is moving through the narrow orifice at relatively high velocity, is provided with a small tapered region at the orifice between the web and the off-running land or knife surface. This region, which is defined between the surface of the web and which has as the upstream wall an extension of the orifice wall itself, provides a small space into which the hot melt material is extruded, and tends to form a region of relatively low pressure, so that all of this material may be picked up by the moving web and carried downstream where it is ironed in by the tapered off-running land. The stepped configuration of the die orifice also serves to prevent back flow of hot melt over the incoming side of the die, so that both sides of the die, in actual operation, run dry.

The construction of the coating apparatus provides for accurate control of the position of the die lips with respect to the web. The die is thus mounted on a pair of arms which are, in turn, pivotably mounted on a further or primary pair of arms. The pivotal mounting of the die supporting arms to the primary arms is preferably on a radius which extends from the center of the backing roll through the die lips, so that adjusted movement about this pivot, to adjust the angularity of the die lips with respect to the web, does not materially change the pressure loading of the die with respect to the web.

The primary arms are supported on a fluid cushion which urges the coater knife into predetermined pressure engagement with the web. Adjustable stops are provided for accurately limiting knife position. In effect, the applicator or off-running land formed on the knife defines a pressure nip which is not unlike that formed between a pair of hard and soft rolls, which is important to the ironing-on function achieved by the die of this apparatus.

Further provision is made for accurately controlling the width of extrusion. This is one of the more critical and important areas in the practical application of hot melts to moving webs. It is important that the width of extrusion be accurately related to the width of the web, wih no weeping, overflow, or axial running of the material past the deckles. If such occurs, the material begins rapidly to build up and soon gets onto the roll and other parts and interferes with the coating process.

In the present invention, the cavity formed within the die is preferably of uniform and constant dimension through its length. In addition, the knife forms an exceedingly narrow and short orifice with the die body. An elastomeric plug which has an outer surface conformed carefully to the interior configuration of the die cavity is received within the die cavity between a pair of pressure plates. The deckle apparatus exerts axial pressure on each side of this plug and causes it to swell out peripherally between the plates and into tight sealing engagement with the entire inside surface of the die cavity and even into the orifice itself. By the use of a very short orifice, it can be thus completely and effectively stopped by the internal deckle plugs for accurately limiting the effective width of extrusion, without axial weeping along the die orifice.

Provision is also included for maintaining the uniformity of the temperature of the elastomeric covered backing roll to equalize the expansion of the roll along its length. Since the hot melt material is applied at elevated temperatures and since the elastomeric covering has an index of expansion considerably higher than that of the steel shell, and since this expansion in a roll can only be radially outwardly of the roll, there results a considerable degree of expansion during coating. This is not undesirable since it assures that the cooler portions of the roll axially outward of the die deckles will not run in interference with the die body.

A quick opening and cleaning arrangement is provided by which the knife can be swung away from the die body to expose the underside of the knife, the knife ironing surface, and the interior of the die, for rapid cleaning. A particular advantage of this arrangement is that the accurately defined relationship of the knife to the die is maintained during the cleaning operation, and at the conclusion of the cleaning the knife may be swung back into position with maintenance of the original registration and knife alignment.

It is accordingly an important object of this invention to provide an extrusion type of coater for the direct application of hot melt material to the surface of a web supported on a resilient backing roll.

Another important object of this invention is the provision, in a coater, of an extruder die construction in which a knife forms one of the walls of the extruder orifice and which has a downstream land surface which is so configured with respect to a resiliently supporting web so as to iron onto the web surface a controlled mount of coating material.

An important advantage of this invention is the elimination of the influence of web tension on coating weight. Another advantage is the provision of a hot melt coater in which the weight of coating is not affected by changes in web speed.

Another object of the invention is the provision of a coater, as outlined above, in which a web is brought into pressure engagement with one surface of an extruder die adjacent an orifice and in which an on-running land forms an inwardly stepped configuration with an off-running land, with only the off-running land being in pressure engagement with the web. As a further object, the off-running land forms a converging nip with the web leading from a narrow and short die orifice through which the hot melt material is extruded under pressure, and in which the stepped configuration effectively prevents backflow against the direction of web movement.

Another object is the provision of a deckle employing an elastomeric plug which may be positioned axially within the die cavity and which is expanded outwardly for completely filling the cavity and effectively blocking the die orifice.

An important feature and advantage of the present invention resides in its inherent ability to apply a wide variety of hot coating materials to a moving web and particularly in its ability to handle materials which are not self-supporting in the extruded stage and which may also have a sharply defined melt point or which may oxidize rapidly when exposed to the air.

These and other objects and advantages of the present invention will be apparent from the following description, the accompanying drawings, and the appended claims.

BRIEF DESCRIPTION OF THE DRAWINGS

FIG. 1 is a side elevation of a coater constructed according to this invention;

FIG. 2 is a front elevation of the coater of FIG. 1;

FIG. 3 is an enlarged vertical section through the die, showing certain die support structure in elevation;

FIG. 4 is a fragmentary end view of the die showing the deckle support and adjuster;

FIG. 5 is a vertical section through the deckle taken generally along the line 5—5 of FIG. 4;

FIG. 6 is a broken away side view of the coater showing the parts in somewhat larger detail than in FIG. 1, and also showing the primary support arms in the moved position in broken line form;

FIG. 7 is a plan view partially broken away of the mechanical knife pressure and profile control;

FIG. 8 is an elongated somewhat diagrammatic and fragmentary view of the die and knife in relation to the web and back-up roll;

FIG. 9 is an enlarged detail of FIG. 8;

FIG. 10 shows apparatus for opening the die for inspection and cleaning; and

FIG. 11 is a perspective view of the deckle plug.

PREFERRED EMBODIMENT OF THE INVENTION

Referring to the figures of the drawing which illustrate a preferred embodiment of the invention, a coater constructed according to this invention is shown in FIGS. 1 and 2 as including a main frame having a pair or spaced apart vertical frame members 12 and 13. The frame members adjacent their upper ends support a resilient roll 15 on precision bearings 16 and 17. The roll 15 may be constructed with a steel shell and covered with a blanket 15' of neoprene or silicon elastomeric material or other suitable material which is preferably relatively soft. A suitable example of such material is a silicon elastomer which has a hardness of approximately 50 durometer, Shore A. The backing roll 15 may be bored for the circulation of oil therethrough. Such oil need not be heated or cooled as its primary function is to tend to keep the steel shell at the same temperature throughout. The roll 15 thus forms the means by which a web 18 of sheet material such as paper is guided thereover for engagement with an elongated coating die indicated generally at 20 in FIG. 1.

The die 20 is supported on a transverse die support beam 22 by a pair of vertically adjustable bracket assemblies indicated generally at 23 in FIGS. 2 and 3. The bracket assemblies comprise a pair of upwardly extending arms 25 and are slotted to receive tapered keys 26. A pair of outer clamps 28 are also slotted to receive the keys 26 and are retained on the brackets 25 in predetermined vertical adjusted relation by bolts 29. The upper ends of the clamps 28 extend into suitable grooves formed in the side of the die 20 and support the die in predetermined position above the beam 22 while providing for transverse sliding and expansion movement of the die. As shown in FIG. 2, two of the bracket assemblies are employed to support the die 20 in vertically spaced relation above the transverse die support beam 22.

The die support beam 22 extends between a pair of die support arms 30 and 31 as shown in FIGS. 2 and 6. The die support arms are supported at pivots 34 respectively at their upper ends to a pair of primary coater support arms 35 and 36. The primary arms are each pivotally supported on the frame members 12 and 13 at arm pivots 38, and are joined together by a transverse support tube 40.

The movement of the primary coater support arms 35 and 36 is controlled by air lift bellows 41, positioned in underlying relation to each of the arms, as shown in FIGS. 2 and 6. The bellows 41 are provided with a bottom support plate 42. The rear of the plates 42 are supported on a cross rod 43, and the front ends of the plates are adjustably supported on bolts 44. The upper ends of the bellows 41 consist of a further support plate 45 which is joined to the lower portion of one of the arms 35 or 36.

The raised position of the primary arms is controlled by a pair of adjustable stops 48 and 48' in the end frame members 12 and 13. The adjustable stop 48 in the member 12 is shown in FIG. 6 as extending through a threaded nut 49 into engagement with an abutment 50 formed on the upper surface of the arm 35. The position of the stop 48 may be controlled by the manipulation of either one of two hand wheels 51 and 52, as shown in FIG. 1. The hand wheel 51 is connected through a slip bearing 53 and a universal joint 54 to a shaft 55 (FIG. 7) which operates the stops 48 and 48' through a worm and wheel drive 56. A two-piece axial extension 57 of the shaft 55 runs across the coater to operate the opposite stop 48' through an identical worm and wheel drive 56', as shown in FIG. 7, so that rotation of the hand wheel 51 moves each of the stops 48 and 48' by the same amount. In this manner, the movement of the stops controls the relationship of the die 20 with the web 18 and the roll 15.

The adjacent hand wheel 52 is connected to rotate a threaded shaft 58 which extends into a nut 59, as best shown in FIG. 6. The nut 59 is supported for both swinging and rotational movement in a yoke 60, the latter being mounted on a shaft 61 which provides for rotation of the yoke 60 about the axis of this shaft, as best shown in FIG. 6. Further, the threaded shaft 58 is prevented from axial movement by a pair of collars 63 which are positioned on the shaft on opposite sides of the wall 64 of the frame member 12. Therefore, rotation of the shaft 58 by the hand wheel 52 causes the nut 59 to swing in an arc about the axis of the threaded stop 48 for causing movement of the stop 48 against the abutment 50 at one side of the machine only, for effecting profile adjustments of the die with respect to the web.

The cross tube 40 is provided with arms 68 which contain a rotatable nut 69 which engage a threaded screw 70. The die support beam 22 is formed with a pair of depending plates 71 which support therebetween a rotatable bearing 72 through which the screw 70 extends. Collars 73 are fastened onto the screw 70 on either side of the bearing 72. Rotation of the screw shifts the relative position of the die support beam 22 with respect to the primary arms 35 and 36, between which the beam 40 is mounted. The adjustment provided permits changes to be made in the attitude of the die structure, and particularly that of the knife supported on the die with respect to the web 18 and the roll 15.

The general details of the die and knife assembly are best shown in FIG. 3. The die 20 is formed with a one-piece body 75 which has a cavity 76 formed therein and opening upwardly. The cavity 76 is of constant and uniform dimension throughout its length, and is fed through an inlet fitting 77. The fitting 77 is bolted centrally to the bottom of the die by bolts 78, although more than one inlet fitting may be employed if desired. The fitting 77 is, in effect, a right angle adapter and is threaded to receive a supply hose 80, to apply hot melt material under pressure into the die cavity 76 through a vertical central opening 81 formed in the die body 75. A positive displacement pump 81 receives hot melt material from a circulating loop 82 for delivery through one of a pair of selectable filters 83 and 83' to the hose 80. The rate of delivery of the pump 81 is controlled by a variable speed drive 84 which is, in turn, driven in direct relation to line speed. In this manner, the weight of material applied to the web 18 may be held constant with changes in web speed.

It is important to maintain the temperature of the die accurately throughout its length and also to maintain the temperature of other parts which come into contact with the hot melt material. It is particularly important to maintain a uniform temperature throughout the length of the die to assure uniformity of coat weight across the machine, prevent warpage, and to equalize expansion. The inlet fitting 77, for this purpose, is formed with a further inlet opening 85 into which heated oil is admitted for distribution through pairs of transverse outlets 86 for flow to either die end. Suitable plumbing is provided for applying such heated oil to conduits on the die 20. For this purpose, pairs of conduit pipes 88 are received within recesses formed in the outer surface of the die body 75, and are retained in intimate contact with the die body by hold down plates 89 and screws 90. The conduits are preferably arranged in parallel pairs, as shown in FIG. 3, and the fluid in one of the conduits in a given pair is caused to flow in one transverse direction and the heated fluid in the other conduit flows in the opposite direction, by suitable connecting lines extending from the openings 86 transversely oppositely to the ends of the die. In this manner, a balanced flow of heating fluid is applied to the die body. The hot oil supply and return lines are preferably incorporated in a common sheath with the material supply hose 80 so that the temperature of the hot melt material is controlled.

The die 20 has a knife assembly indicated at 95 in FIGS. 3 and 6 which includes a knife bar 96 which extends transversely generally the length of the die body 75. The knife bar 96 is supported on the die body by a longitudinally spaced series of individual support plates 97 which are attached by bolts 98 to the bar 96. A corresponding series of spaced holders 99 are attached in underlying relation to the support plates 97 in spaced relation to the knife bar and are formed with keyways 100 facing generally downwardly. A corresponding series of stops 102 are provided, and are formed with keys 103 which are received within the keyways 100. The stops 102 are mounted on the exterior surface of the die body 75 by bolts 104 and accurately position the assembly 95 on the die body. Keys 105 may be positioned between the die body and the stops 102 for maintaining an accurate registration of these stops on the die body. The purpose of employing a series of spaced separate knife plates, knife holders and stops, in relation to the die body, is to eliminate any problems due to differential expansion of associated elongated sections, which could otherwise result in warpage of the die when subjected to heat.

The knife assembly 95 is retained on the exterior surface 110 of the die body 75 by a series of bolts 111 which have their inner ends extended into the die body and which seat on spherical washer-like flanges 112. This arrangement provides for relative axial movement of the knife 96 with respect to the die body 75 during heating, and also permits some tilting movement of the assembly 95 in relation to the die body 75 in accordance with the adjustment of a series of cap screws 114 which extend through the plates 99 and into abutment with the stops 102.

The knife bar 96 extends diagonally transversely across the open end of the die cavity 76 in closing relation to this cavity and defines with the opposite wall 115 of the die an extrusion orifice 116 which leads to an oblique angle from the cavity 76. The orifice wall 115 is formed in the same plane as that of the die surface 110 against which the lower surface 117 of the knife bar abuts, as best shown in FIG. 8.

The forward edge of the knife bar 96 undercut as indicated at 118 in FIGS. 8 and 9 defines the opposite wall of the orifice 116. The screws 114 permit some adjustment of the orifice width, but this width is approximately established, in the first instance, by the depth of the undercut 118 so as to minimize the degree of adjustment required.

As shown in FIGS. 8 and 9, not only is the die orifice of relatively narrow width, it is also of short length in the direction of material flow. This is accomplished by providing a controlled but small extent of overlap of the knife bar 96 and the die wall 115. The width and length of orifice thus defined between the opposed walls 115 and 118 may be varied in accordance with the type of material to be applied, and its characteristics. However, the effective length of the orifice is maintained preferably relatively short, such as in the order of from less than 1/64" up to 1/4" or more, with the shorter lengths being employed preferably to cooperate with the internal deckle and deckle plug for effectively blocking transverse flow beyond the deckles, as described below.

The die body 75 is formed with a tapered upstream lip 120 which has an outer tapered surface 121 which may be considered as an on-running surface in relation to the movement of the web. The surface 121 converges toward the web 18 in the direction of web movement and terminates at the orifice-defining wall 115. The knife 70 is formed with a planar off-running applicator surface 122 which is offset somewhat radially outwardly at the orifice 116, in relation to the roll 15, from the adjacent position of the surface 121. The surface 122 is substantially normal to the plane of the orifice 116, but is preferably tapered slightly back to form a slight acute angle with the plane of the orifice. While the orifice itself is directed generally radially toward the web 18, it is preferably oriented slightly against the direction of web movement.

The radially outward offset of the knife applicator surface 122 is relation to the surface 121 of the die body defines a step or offset indicated at 125 in FIG. 9, which offset creates a small clearance space at the downstream side of the orifice 116 when considered in relation to the web 18.

The surface 122 of the knife bar 96 is terminated downstream at a sharp break indicated at 130, and is somewhat undercut to form a concave back surface 132, thus forming a sharp and sudden separation with the material which has been applied to the web 18. The entire die 20 including the die body 75 and the knife assembly 95 is preferably positioned, in use, by suitable adjustment of the attitude control so that the applicator surface 122 of the knife bar 96 forms a converging nip with the web 18 in the direction of web movement. In this condition, the sharp break edge 130 is substantially closer to the web than is the edge of the surface 121 adjacent the orifice 116. The step 125 has two principal functions:

First, it provides a clearance space into which the material from the orifice 116 may move in relatively unimpeded manner for application to the surface of the web. Second, the stepped surface helps prevent back flow of coating material contrary to the direction of web travel, so that the incoming surface 121 remains dry and free of coating material. The air at the surface of the web is displaced by the coating material and escapes over the surface 121 in the direction opposed to web travel. The web is moving over the step 125 and the knife surface 122 at a speed which far exceeds that of the material moving through the orifice 116 so that the material is actually stretched and thinned out, and rapidly accelerated, as it is applied to the web surface by the applicator surface 122.

The step 125 may have a dimension measured radially of the roll 15 of from .005 inch to .080 inch and good results have been obtained with a step of .030 inch.

It is only necessary that the applicator surface 122 extend a short distance in the direction of web movement, during which time the material is accelerated to the speed of the web and is bonded to the web surface. As an example, the knife face may have a length of between 1/4" or less up to 1" or more in this direction, with good results having been obtained with a surface 122 of 5/16" in the direction of web movement.

The deckle (FIGS. 5 and 11) includes a plug or block 140 of elastomeric material which is shaped to conform closely to the inside dimensions of the die cavity 76, and the tapered upper surface of the cavity formed by the bottom wall 117 of the bar 96. It is received within the cavity, as shown in FIG. 5, between an inside backing plate 142 and an outside backing plate 143. Plates 142 and 143 are retained by an assembly consisting of a yoke 144 with cap screws 145 which are threaded into spacers 146. Two of such spacers extend through the outside plate 143 and through openings 147 in the plug 120 and into abutment with the plate 142. An additional pair of bolts 148 are threaded into the opposite ends of the spacers through the inside plate 142.

The yoke 144 further includes a pair of adjusting screws 150 which are threaded into the yoke and abut into engagement with the outside plate 143. The adjusting screws 150 are accessible by inserting a wrench through the end of the cavity 76 to force the plates 142 and 143 together, thus imposing a compressive force on each of the sides of the plug 140 extruding and forcing the peripheral portion of the plug material into tight sealing engagement with the corresponding inner surfaces of the cavity 76, and the bottom surface of the knife bar 96. The seal is so effective that a portion of the plug 140 actually extrudes out into the short orifice 116 effectively blocking the same and preventing the escape of coating material by flow along this channel.

Means for positioning the deckle within the cavity 76 includes a bracket 155 which is mounted on the end of the die body 76 and which retains a yoke 156 and a threaded nut 157. A screw 158 extends through the yoke 156 and the nut 157, and has its inner end keyed to the yoke 144, so that rotation of the nut 157 operates to cause the deckle plug 140 to move either inwardly or outwardly with respect to the die cavity. While the deckle plug and positioning apparatus is shown on one end of the die only it is understood that similar apparatus is employed at the other end of the die for accurately defining and limiting the width of extrusion.

FIG. 10 shows apparatus for readily removing the knife assembly 95 while maintaining the accurate alignment and registration of the knife assembly parts, for the purpose of exposing the interior of the die as well as the knife bar for cleaning. It is important, in the event of shut-down, that the die cavity be readily accessible for cleaning the cavity and associated parts of the coating material before it has an opportunity to harden. For this purpose there is provided a simple but effective opening arrangement including a pair of pivotal operators with side brackets 160 which are mounted to the outside surface of one of the clamps 28 and secured by a bolt 162. An upper lever 164 has a handle 165 and a forwardly extending lifting arm 166 which has an end 167 received in a suitable tapped opening and retained by a bolt 168. The lever 164 is pivotally mounted on the bracket 160 at a pivot joint 170 and is so proportioned that the initial movement by rotation of the handle 165 serves effectively to lift the knife assembly off of the keys 103, following removal of the bolts 111. Thus, the die is exposed for cleaning, and the knife assembly 95 may be returned to its original position and the accurate registration and alignment maintained. Preferably two of the knife opening operators are provided adjacent the opposite ends of the die 20 for manual manipulation, and, if desired, may be left in place during operation.

There may exist a thermal gradient in the roll covering which causes the portion of the roll adjacent the ends of the web to run at a temperature which is less than the remaining portions of the roll. Since the elastomeric covering material has a coefficient of expansion which substantially exceeds that of the steel support shell, the coating tends to be applied substantially heavier at the regions adjacent the edge of the web due to the greater clearance between the applicator surface 122 of the knife bar 96 and the web. This condition can be overcome by the application of localized heat to make up for the loss of heat due to the thermal gradient which exists at the edges of the web. This provides uniform coat weight along the width of the web.

In use, the air lift bellows 41 may be operated so as to move the primary support arms to the lowered position as shown by the broken lines in FIG. 6, and the web threaded about the cylinder 15. The web is started at the same time as the heated material is applied through the host 80 to the inlet fitting 75. The knife pressure control wheel 51 is adjusted, while the coating material is applied, to control the surface condition of the material which is applied to the web, by the simultaneous movement of the stops 48 and 48'. The knife applicator surface 122 may exert a substantial force against the web, so that the relationship between the knife surface 122 and the web 18 is not unlike that of a nip forming between a hard and resilient roll. This force can therefore be stated in terms of pounds per linear inch, and may be as much as 30 p.l.i. or more in actual use.

The attitude of the knife bar 96 with respect to the web may be controlled by suitable positioning of nut 69 on the screw 70. This has the effect of moving the die support beam 22 and the die 20 on the arms 30 and 31 about the pivot 34. The axis of the pivot 34, as shown perhaps best in FIG. 6, is on substantially a straight line or radius passing through the knife applicator surface 122 and the center of rotation of the roll 15. Therefore, the adjustments of attitude, which may provide, for example, adjustments of ±5–15° while the die is operated, may be effected to control back leakage, which may occur with changes in speed and viscosity and may also be used to provide optimum surface conditions of coating.

The profile control 52 may be operated initially to equalize the distribution of coating across the machine.

The coater of this invention thus is a versatile and useful machine for applying a wide variety of hot melt coatings to a moving web and for causing intimate bonding of the material with the surface of the web. The structure of the die is adapted to handle material having a wide range of viscosities and temperatures since only the amount of material which is desired, is applied directly by the knife forming an off-running applicator land immediately at the extrusion orifice, without the necessity or need for applicator rolls or doctor blades. Thus the material never comes into contact with any structure other than the web after the web passes the orifice and applicator land 122. The employment of a resilient back-up roll directly opposite an extrusion orifice, and the employment of offset on-running and trailing applicator lands provides a structure by which high applicator forces can be employed to provide an ironing on of the hot melt material without overrun, waste, or material build-up on the coater parts. The expansible deckles employing an elastomeric plug within the die cavity in combination with the relatively short orifice length provides an effective means by which the width of extrusion can be accurately controlled. The diagonal offset relation of the orifice 116 with respect to the toll provides a structure which is readily observable in operation and yet one which is completely and readily accessible for cleaning.

One of the important advantages achieved by the hot melt coater of this invention is that there is no necessity for the rehandling of the hot melt material once it has been applied by the die. In other words, since the scraping off and doctoring of excess material is completely eliminated there is thus eliminated the entrainment of air bubbles into the supply of this material. It has been found that the return flow of doctored off excess hot melt coating results in a substantial entrainment and encapsulation of air into the supply of coating material and this air is then taken into the pumping system, broken down into very minute bubbles and soon begins to be applied in the supply to the applicator resulting in the formation of bubbles and pin holes in the coated material on the web. Although these defects may be microscopic in size, they severely adversely affect the oil and vapor barrier qualities of the resulting product.

In addition, the elimination of doctoring and recirculating eliminates problems caused by changes in temperature, chemical composition such as caused by evaporation of solvents, and atmospheric degradation of the coating material. Since the doctored off material is subject to cooling to exposure to the atmosphere and the like it is thus returned to the supply in a different state and can cause problems in maintaining uniformity of product.

A further important advantage of the invention resides in the fact that the head can be easily cleaned, by contrast to other types of applicator systems which have more parts coming into contract with the hot melt material. Further, the fact that the die cavity is of uniform dimensions throughout its length imposes no restriction upon the positioning of the deckles and these may, in practice, be positioned anywhere along the length of the die, as desired.

The employment of air lift bellows 41 and adjustable stops 48 and 48' permit the coater to be operated in two diffierent modes. First, the die 20 may be supported exclusively by the bellows 41 with a force against the web 18 which is balanced by the weight of the supported coating apparatus and the hydrodynamic force of the pumping action of the fluid coating onto the web 18. In this manner, the coating head 20 may be considered as floating on a film of coating material between the applicator surface 122 and the web. Changes in web speed may require certain changes in air pressure to the bellows 41 in order to compensate for differences in the hydrodynamic forces involved. When the coating apparatus is operated in the floating condition, the stops 48 and 48' may be positioned so as to prevent accidental contact of the die head with respect to the roll.

If desired, the position of the head may be controlled by a combination of air bellows and stops 48, with the stops remaining in contact with the abutments 50 on the arms 30 and 31 at all times. In this condition, the stops 48 may then be adjusted to control the coating pressure of the knife, as desired or as required due to change in web speed or viscosity of the material.

The attachment of the support tube 40 to arms 35 and 36 is such that general coordination of the arms is provided while there is sufficient independent movement of each arm to enable the above modes of operation to be effective.

While the form of apparatus herein described constitutes a preferred embodiment of the invention, it is to be understood that the invention is not limited to this precise form of apparatus, and that changes may be made therein without departing from the scope of the invention.

What is claimed is:

1. A coater for applying a liquid coating to a moving web of sheet material, comprising a backing roll over which said web is guided for movement, a die body positioned generally in underlying relation to said roll and having an extrusion cavity therein which opens generally upwardly toward said roll, said cavity being of generally uniform dimension throughout its length, an applicator knife on said body forming a partial closure for said cavity and defining an extrusion orifice with said body for the application of said coating to said web, means for urging said applicator knife into pressure engagement with said web at said roll, and a deckle for controlling the width of extrusion from said body including an elastomeric plug in said cavity having a peripheral portion closely conforming to the inside walls of said cavity, a pair of backing plates positioned on the opposite sides of said plug in said cavity, and means connecting said backing plates operable to apply a compressive force to said plug for expanding said plug into tightly sealed relation with the walls of said cavity to limit the flow of hot melt coating.

2. A die type coater for applying material to a moving web of sheet material comprising resilient means for supporting such web, a die body positioned adjacent said supporting means and having means therein defining a transversely aligned distribution cavity and a die orifice leading from said cavity, means on said die body forming on-running and off-running lands extending respectively upstream and downstream from said die orifice, means urging said die body into pressure engagement with said web at said off-running land with said off-running land being in converging relation to said web in the direction of web movement for ironing onto said web such material as is extruded through said orifice, and resilient expandable plug means received in said die body cavity for blocking the flow of such material through said orifice to define the width of extrusion therefrom.

3. The coater of claim 2 further comprising a knife removably received on said die body and defining on one surface thereof said off-running land, said on-running land being defined by an integral portion of said die body.

4. The coater of claim 3 in which said on-running land defines with said knife surface a step at said orifice providing a space into which material from said orifice flows for application to said web by said knife surface.

5. In a coater for applying a material in liquid form under pressure and to a moving web of sheet material, the improvement in applicator apparatus comprising a transversely oriented applicator body having an elongated cavity therein and having means defining a generally upwardly opening slit forming an extrusion orifice and leading from said cavity to an applicator surface on said body, the depth of said slit in the direction of liquid flow forming a small part of the depth of said cavity, and means for limiting the transverse extent of extrusion from said slit including an elastomeric body having an outer configuration closely conforming to the internal dimension of said cavity, and means for transversely compressing said body to force said body outer portions into intimate peripheral sealing engagement with the walls of said cavity and forcing an adjacent portion of said body into said slit for defining the extent of transverse flow from said applicator body.

6. The apparatus of claim 5 in which said compressing means comprises a pair of backing plates positioned on opposite sides of said plug within said cavity, and means connecting said backing plates to apply a compressive force to said plug.

7. A coater for applying a liquid coating to a moving web of sheet material comprising a frame, a backing roll mounted on said frame and having a resilient surface over which such web is guided for movement, a die body positioned in generally underlying relation to said roll and having an extrusion cavity therein opening generally upwardly toward said roll, an applicator knife mounted on said body forming a partial closure for said cavity and defining an extrusion passageway with said cavity, said knife having means forming an applicator surface extending from said passageway generally in the direction of web movement, a pair of transversely spaced support arms mounted on said frame and supporting said body with said applicator surface in pressure engagement with said web against said roll, a pair of adjustable stops for limiting the movement of said die on said arms, first means for positioning said stops together to regulate the pressure contact of said applicator surface and said web, and second means for selectively positioning one of said stops with respect to the other to regulate the profile of said pressure contact.

8. A coater for applying a liquid coating to a moving web of sheet material comprising a frame, a backing roll on said frame over which such web is guided for movement, a die body, means mounting said die body on said frame in generally underlying relation to said roll, said body having a transverse extrusion cavity therein opening generally upwardly toward said roll, an applicator knife assembly removably mounted on a surface of said body having a transverse knife bar forming a partial closure for said cavity and defining a relatively narrow and short extrusion passageway with one wall of said cavity, said knife having means forming an applicator surface extending from said passageway generally in the direction of web movement, means in said body forming a keyway engageable with said assembly for accurately locating said bar with respect to said body, and lifting arms pivotally mounted on said frame and engageable with said knife assembly for lifting said assembly off of said body keyway for cleaning access to said cavity while maintaining accurate registration of said knife bar.

9. A coater for applying a hot melt to a moving web of sheet material comprising a frame, a backing roll mounted on said frame and having a resilient surface over which such web is guided for movement, a die body positioned in generally underlying relation to said roll and having an extrusion cavity therein opening generally upwardly toward said roll, an applicator knife mounted on said body forming a partial closure for said cavity and defining an extrusion passageway with said cavity, said knife having means forming an applicator surface extending from said passageway generally in the direction of web movement, and means for maintaining a uniform temperature throughout the length of said die body including a series of parallel pairs of fluid conduit pipes extending longitudinally of said die body for the application of heated fluid thereto.

10. A coater for applying a liquid coating to a moving web of sheet material comprising a backing roll having a resilient surface over which such web is guided for movement, a die body positioned in generally underlying relation to said roll and having an extrusion cavity therein opening generally upwardly toward said roll, an applicator knife mounted on said body forming a partial closure for said cavity and defining a relatively narrow and short extrusion passageway with one wall of said cavity, said knife having means forming an applicator surface extending from said passageway generally in the direction of web movement, means for urging said applicator surface into pressure engagement with said web against said roll, and means supporting said die body for angular adjusting movement about a pivot axis which lies substantially on a radius from the center of said roll through said applicator surface providing for angular adjustment of such surface with respect to said web without appreciable change in the engagement thereof with such web.

References Cited

UNITED STATES PATENTS

| | | | |
|---|---|---|---|
| 2,474,691 | 7/1949 | Roehm | 91—43 |
| 2,918,899 | 12/1959 | Munton et al. | 118—413 |
| 3,079,889 | 5/1963 | Jacobs et al. | 118—8 |
| 3,169,082 | 2/1965 | Krikorian | 118—413 |
| 2,330,282 | 9/1943 | Hazeltine et al. | 18—15 SUX |
| 3,238,563 | 3/1966 | Hoffman | 18—12 OSUX |
| 3,285,225 | 11/1966 | Recor | 118—410 |

ANDREW R. JUHASZ, Primary Examiner

L. GILDEN, Assistant Examiner

U.S. Cl. X.R.

18—13R